F. P. SMITH.
Gang Plow.
No. 82,165. Patented Sept. 15, 1868.
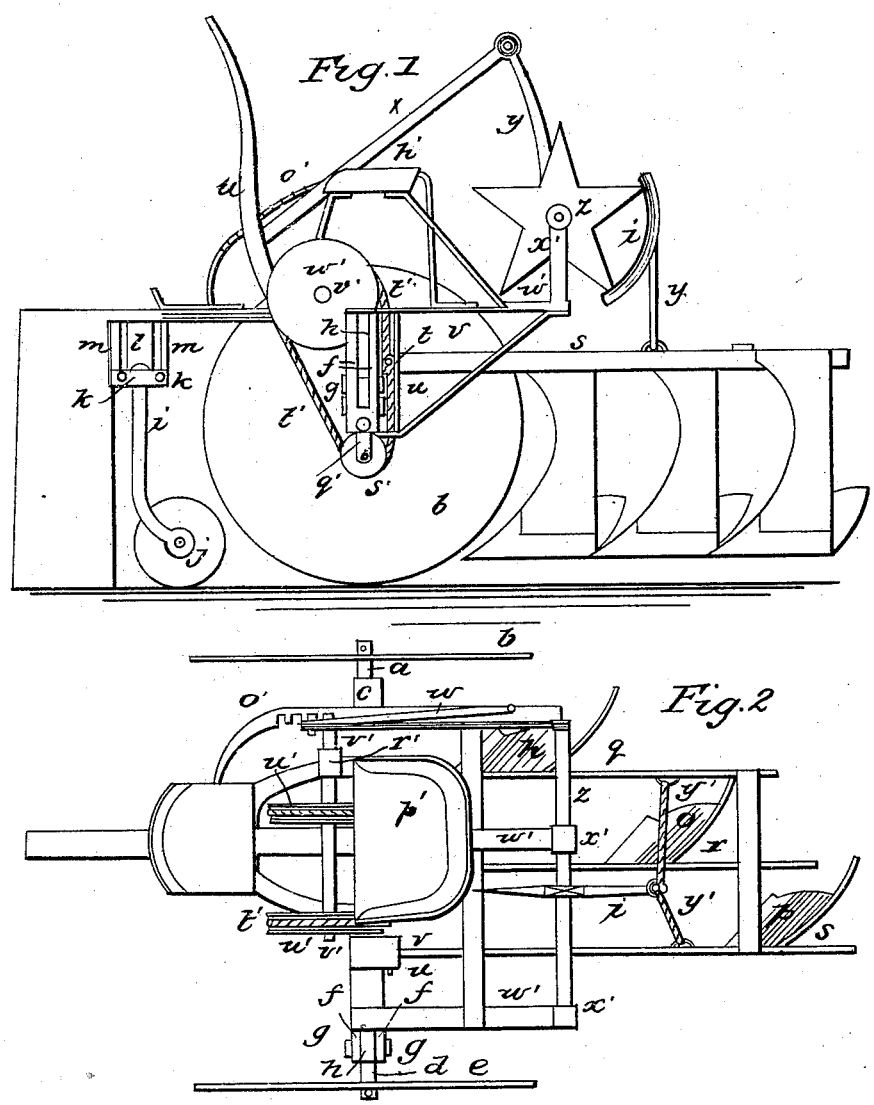
WITNESSES
T. Smith
L. E. Jones
INVENTOR
F. P. Smith
By atty Thos. T. Emitt

United States Patent Office.

FREDERICK P. SMITH, OF PETALUMA, CALIFORNIA.

Letters Patent No. 82,165, dated September 15, 1868.

IMPROVEMENT IN GANG-PLOW.

*The Schedule referred to in these Letters Patent and making part of the same.*

TO ALL WHOM IT MAY CONCERN:

Be it known that I, FREDERICK P. SMITH, of Petaluma, in the State of California, have invented a certain new and useful Improvement on Gang-Plows; and I do hereby declare that the following is a full, clear, and exact description of the same, reference being had to the accompanying drawings, and to the letters and marks thereon, which said drawings form part of this specification, and represent a plow constructed under my invention—

Figure 1 being a side view, with the land or unbroken-soil wheel removed, and

Figure 2 being a top view thereof.

In both of these figures, where like parts are shown, like marks and letters are used to indicate the parts.

In this plow, the axle $a$ of the furrow-wheel $b$ is permanently attached to the beam $c$. The axle $d$ of the land or unbroken-soil wheel $e$ is attached to the bars $f$, on the end of the beam, by nuts and bolts $g$, the slot or space $h$ in or between the bars $f$ allowing of the vertical adjustment of the axle $d$ to adapt the wheel to the land or ground being traversed over. The forked arm $i$, which holds the caster-wheel $j$ at its upper end, has a similar means for adjustment by nuts and bolts $k$, and the slots $l$ of the bars $m$ attached to the rear of the tongue of the plow.

The plows, $n$ $o$ $p$, are affixed to the frame-bars $q$ $r$ $s$. A hole in the front end of these frame-bars allows the passing through of the rod $t$, for the suspension of the bars thereon, which rod passes through the bars $u$, affixed to the beam $c$, there being a space, $v$, between each set of the bars $u$, for the upward and downward movement of the ends of the bars. The movement of the bars, and the plows attached thereto, is strictly vertical, the rear and the front ends of the bars being operated at the same time and by the one motion of the hand-lever $w$. Each plow will therefore be raised or lowered to the same degree or extent. The rear ends of the bars are connected to the lever $w$ by the rod $x$, lever $y$, shaft $z$, segment or sector $z'$, and cord or chains $y'$, the shaft $z$ having bearings in the arms $x'$, affixed to the bars $w'$, the forward ends of which are affixed to the top of the beam $c$.

The front ends of the bars are connected to the lever $w$ by the shaft $v'$, which is attached to the lower end of the lever, and may be made of the same piece of metal, and as an extension of the lever, and the other devices shown by the drawings, viz, pulleys $u'$ on the shaft $v'$, cords or chains $t'$, and pulleys $s'$. The shaft of the pulleys $u'$ has its bearings in the bars $r'$ which are attached to the beam $c$, and the shaft of the pulleys $s'$ has its bearings in bars $q'$ attached to the lower part of the beam $c$. The cords or chains $t'$ are affixed to the rods $t$, as shown by fig. 1, so that as those chains or cords are moved up or down, they give a like movement to the rod and the ends of the bars.

The lever $w$ is near the driver's seat $p$, and it will be noticed that the frame and plows can at any moment be readily raised or lowered, and thus easily be adapted to the soil being plowed, and to the variations of the surface, as also to whatever obstructions may be in the track of the plow, while both the frame and the plows can be elevated to adapt the plow for travelling from one location to another, the usual curved toothed bar $o'$ being used to hold the lever in its desired position.

What I claim as my invention, and desire to secure by Letters Patent, is—

1. The arrangement of the devices and means herein recited for raising and lowering the frame and plows.

2. The bars, with spaces on the end of the beam, and on the tongue, with the bolts and nuts for the adjustment of the land-wheel axle, and the caster-wheel's arm, as herein set forth.

This specification signed, this 13th day of April, 1868.

FREDERICK P. SMITH.

Witnesses:
WILLIAM K. DAVIS,
JAMES W. STEWART.